United States Patent [19]

Sato et al.

[11] 4,284,358

[45] Aug. 18, 1981

[54] MIXING AND KNEADING MACHINE

[75] Inventors: Norimoto Sato, Kodaira; Minoru Miyaoka, Hachioji; Shin Yamasaki, Tokorozawa; Kimio Inoue; Akimasa Kuriyama, both of Kobe; Tsugushi Fukui, Miki; Toshihiro Asai; Kazuhiko Nakagawa, both of Kobe; Tatuo Masaki, Akashi, all of Japan

[73] Assignees: Bridgestone Tire Co., Ltd., Tokyo; Kobe Steel, Ltd., Kobe, both of Japan

[21] Appl. No.: 51,001

[22] Filed: Jun. 22, 1979

[30] Foreign Application Priority Data

Jun. 23, 1978 [JP] Japan .............................. 53/76687
May 18, 1979 [JP] Japan .............................. 54/61917

[51] Int. Cl.³ .......................... B29B 1/06; B01F 7/00
[52] U.S. Cl. ..................................... 366/97; 366/297; 366/300
[58] Field of Search .................. 366/97, 91, 84, 297, 366/299, 327, 328, 329, 317, 300, 301, 325, 292; 425/204, 208, 209

[56] References Cited

U.S. PATENT DOCUMENTS

| 1,200,070 | 10/1918 | Bandbury ............................. 366/91 |
| 2,231,911 | 2/1941 | Hitt ..................................... 366/300 |
| 2,309,594 | 1/1943 | Hutchings . |
| 2,559,418 | 7/1951 | Ford ..................................... 366/91 |
| 2,736,754 | 2/1956 | Webb ..................................... 366/75 |
| 2,820,618 | 1/1958 | Bolling ................................. 366/297 |
| 2,987,760 | 6/1961 | Grubenmann ......................... 366/91 |
| 3,230,581 | 1/1966 | Tyson .............................. 366/297 X |
| 3,403,894 | 10/1968 | Matsuoka ............................. 366/97 |

FOREIGN PATENT DOCUMENTS

| 1454771 | 12/1962 | Fed. Rep. of Germany ............. 366/84 |
| 820147 | 7/1937 | France ................................. 366/97 |
| 42-27032 | 11/1967 | Japan ................................... 366/97 |
| 4943330 | 12/1967 | Japan ................................... 366/97 |

Primary Examiner—Edward J. McCarthy
Attorney, Agent, or Firm—Oblon, Fisher, Spivak, McClelland & Maier

[57] ABSTRACT

A mixing and kneading machine including a pair of parallel rotors each having a long vane and a short vane, both of which extend spirally about the center line of the rotors. A length ratio of the short vanes to the long vanes is selected within a range of 0.48 to 0.1. Also described is a mixing and kneading device which has a pair of parallel rotors rotating in opposite directions within a mixing chamber defined by a casing and an end frame. Each of the rotors comprises a long vane and a short vane, both of which extend spirally about the center line of the rotor, the spiral direction thereof being selected such that material to be mixed flows from the edges of the rotors into the central portion thereof. The ratio of the length of the short vane to that of the long vane is determined within the range of 0.48 to 0.1 and a ratio of axial thrust exerted on the material by the short vane to that by the long vane is determined between 0.7 and approximately 0.

5 Claims, 15 Drawing Figures

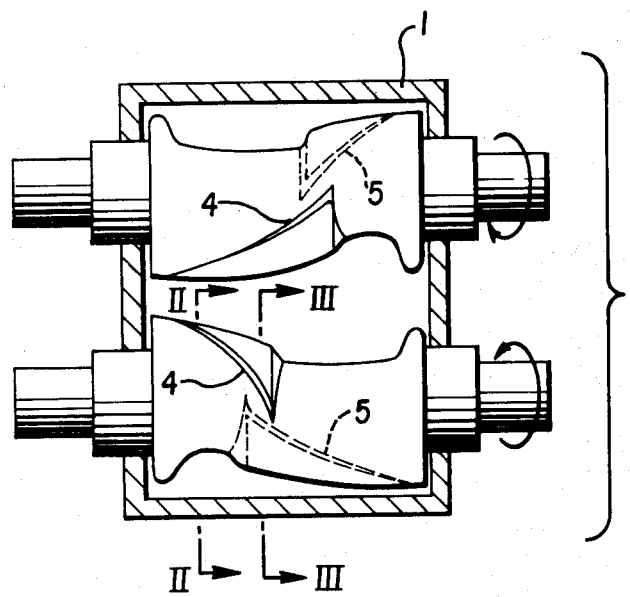
PRIOR ART
FIG. 1
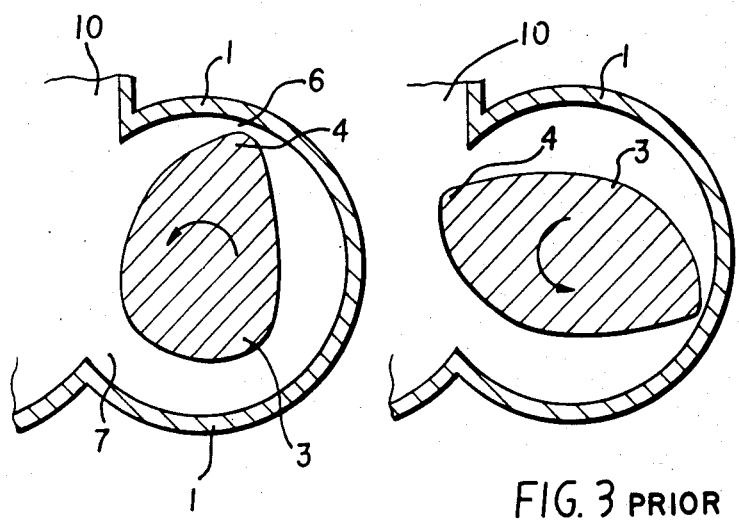
FIG. 2 PRIOR ART
FIG. 3 PRIOR ART

MIXING AND KNEADING MACHINE

BACKGROUND OF THE INVENTION

1. Field of the Invention

This invention relates to a mixing and kneading device in a socalled internal mixer which performs a thorough mixing and kneading operation irrespective of the kind of material.

2. Description of the Prior Art

An internal mixer is a batch type kneader suitable for the intermingling of rubber and one of indispensable facilities in the rubber industry, for example, in tire manufacturers as a mixer suitable for mastification of rubber, carbon master batch kneading of rubber or kneading of a vulcanizing agent commonly known as pro-kneading.

A prior art internal mixer, as indicated in FIGS. 1 through 3, includes a pair of parallel rotors 2,3 provided within a chamber 1 for rotation in opposing directions to each other, each of which has a long vane 4 and a short vane 5. Both vanes extend spirally about the axis of the rotors. The spiraling or screwing direction of the long vanes is opposite to that of the short vanes. Materials introduced via a hopper not shown are sent under pressure from a supply inlet 10 into a mixing chamber 7 by the breaking-into action of the rotors and the depressing action of a floating weight. After being subjected to the rolling action by the rotors, the materials are ground between the edges of the vanes of the rotors and the inside wall of a casing (viz. a chip clearance 6), advancing in the axial direction of the rotors. These events occur on the long vanes and short vanes independently of each other. Since the screwing direction of the long vanes differs from that of the short ones, the materials run from the edge to the center with respect to the respective rotors and the mixed and kneaded material is delivered from the bottom of the chamber.

Another prior art example, as indicated in FIGS. 4 to 6 and 10, includes a so-called four-vane rotor having two long vanes and two short vanes; a total of four vanes on each of the rotors. It is well known that while the construction is substantially the same, the four-vane rotor has a double chip in comparison with the above described two-vane rotor, promoting microscopic dispersion of an additive and assuring a high degree of mixing and kneading efficiency. FIG. 10 shows the flow characteristics of materials past the rotors.

In order to produce a homogeneous mixture, macroscopic dispersion also is of great importance whereby the materials are uniformly mixed while keeping a uniform density of an additive everywhere in the resultant mixture and a uniform density of the mixture itself. For example, failure to produce a homogeneous mixture of a vulcanizing agent in the pre-kneading step of the manufacture of tires results in unevenness of physical properties of final products and difficulties in manufacturing quality tires. While the proportion of steel radial tires with steel cords embedded in the tires to overall tires has been increased more and more from a safety standpoint in high speed driving, there has been a trend to employ as rubber for such steel radial tire use materials which are much more hard per se and difficult to obtain a homogeneous mixture and dispersion than the conventional rubber material. To this end the prior art internal mixer lacked satisfactory strength of the mixing and kneading device and sufficient dispersibility of various agents.

SUMMARY OF THE INVENTION

With the foregoing in mind, it is an object of the present invention to provide a mixing and kneading machine which accomplishes a thorough intermingling of materials irrespective of the kind of the materials even from a macroscopic point of view while considering movement of the materials within the internal mixer in operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a plan view of rotors in a prior art internal mixer;

FIGS. 2 and 3 are cross-sectional views, respectively, along the lines II—II and III—III of FIG. 1;

DETAILED DESCRIPTION OF THE PREFERRED EMBODIMENTS

Respective rotors of the conventional internal mixer have spiral vanes adapted to advance the materials in the axial direction of the rotors as seen from FIGS. 1 through 6. Movement of the materials within the interior of a mixing chamber can be thus regarded as divided into a flow of the materials in the axial direction of the rotors and a flow between the left hand and right hand sides of the mixing chamber receiving the rotors therein. To produce a homogeneous mixture, it is necessary to accelerate both the flow along the axial direction and the flow between both sides of the mixing chamber while keeping the materials from staying within the mixing chamber.

With pro-kneading of hard rubber by means of the internal mixer (internal volume: 236 l) having the four-vane rotors, it was found that dispersion of the agents was markedly nonuniform in some kinds of rubber and the four-vane machine was substantially inferior in dispersing performance of an additive to the two-vane counterpart. To resolve such problem, a test machine was made and flowing behavior of the materials within the mixer was carefully observed. A barrel of the test machine was made by acrylic resin and configured to enable direct observation of flow of the materials therein. Moreover, in order to evaluate quantitatively the degree of dispersion, a prescribed amount of colored plastic beads (polystyrene) was added and after kneading the number of the beads contained within a given sample were measured repeatedly (n times) and displayed in terms of deviation ($\sigma_{n-1}$). The test machine was made with the same dimension as an internal mixer of 1.7 l of internal volume. An aqueous solution with 30% of CMC (carboxymethyl-cellulose) was found suitable as a material showing flowing behavior similar to hard rubber within widely available mixers and actually used in the inventors' experiments.

Figure 7A:
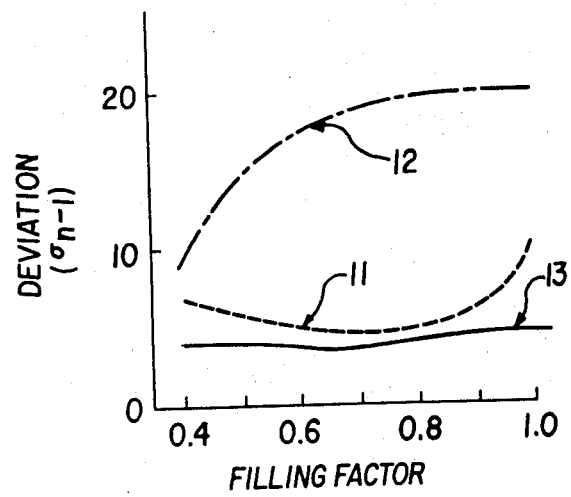
FIGS. 7(a) and 7(b) are graphs showing dispersing performances of rotors embodying the present invention and the prior art.
Figure 7B:
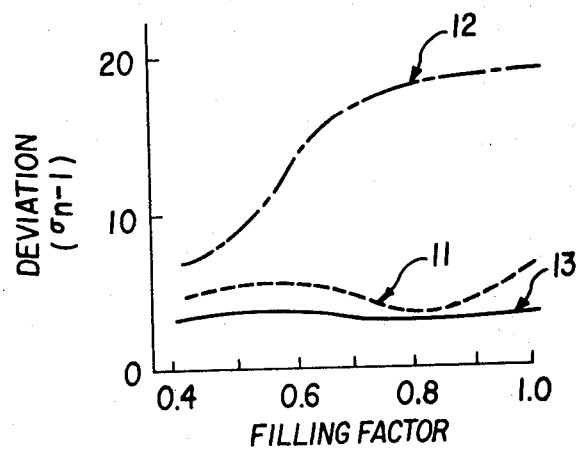

The findings of kneading experiments on the test materials using the two-vane rotors and the four-vane rotors within the test machine are depicted in FIGS. 7(a) and 7(b) wherein FIG. 7(a) shows the bead deviation with 40 sec. of kneading operation and FIG. 7(b) shows the same with 60 sec. of kneading operation. As compared with the curve 12 concerning the four-vane rotors, the curve 11 in the case of the two-vane rotors suggested that bead dispersion was better throughout a wide range of filling factor (a volume ratio of the material to the mixing chamber) of 0.4 to 1.0 and homogeneous dispersion was assured for a shorter period of kneading. In contrast to this, the four-vane rotors performed only rather deficient dispersion with increasing filling factor and was not able to improve dispersion performance even when extending a period of kneading. The reason why the four-vane rotors were inferior in dispersion performance was that the two long vanes and the two short vanes on each rotor were twisted in such a direction as to push the materials toward the central portion thereof.

Figure 4:
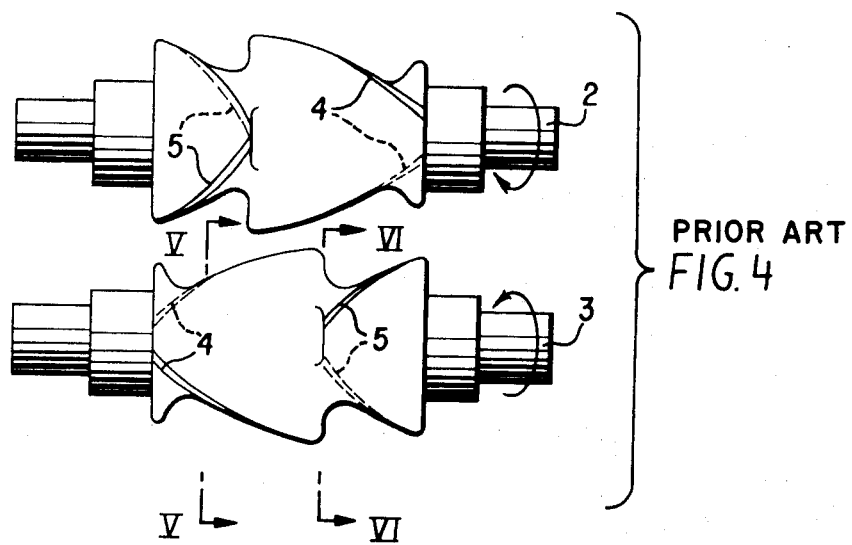
FIG. 4 is a plan view of another type of prior art rotors.
Figure 5:
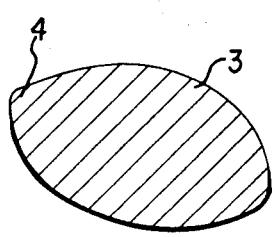
FIGS. 5 and 6 are cross-sectional views, respectively, along the lines V—V and VI—VI of FIG. 4.
Figure 6:
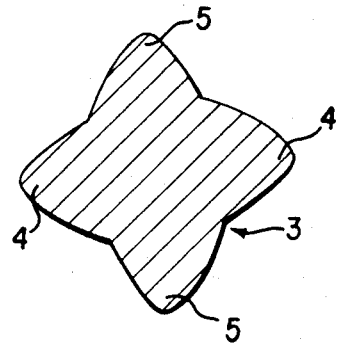

While as best seen from FIG. 6, the respective edges of the vanes were disposed 90° out of phase from each other to facilitate movement of the materials at the central portion where the long vanes were located most closely to the short ones, the materials flowing from one end of the rotor axis to the central portion due to the action of the long vanes could not advance toward the other end after leaving the edges of the long vanes. The results were that a portion of the materials were reverted to the central portion due to the action of the short vanes having the opposite direction of twisting to the long vanes so that the reverting materials were in conflict with the advancing materials. It was therefore revealed that such conflict caused deficiency of flow of the materials along the axial direction. Contrarily, in the case of the two-vane rotors, while the edges of the long vanes were overlapped in part with the edges of the short vanes at the central portion as shown in FIG. 1, the materials flowing toward the central portion of the rotor axis were released by the edge portions of the long vanes to flow into a cavity on the rear side of the short vanes and then pushed toward the long vanes. Although flow of the materials itself was identical to the four-vane rotors, each of the rotors had only the single long vane and the single short vane so that there was wider room for movement of the materials, thereby accelerating axial flow of the materials and assuring a homogeneous mixture.

With respect to deficient kneading due to such insufficient flow of the materials in the four vane rotor structure, one approach was suggested by David Z. Taison et al as fully disclosed in Patent Publication 42-27032. Cross-sectional configuration of the long vane and the short vane was designed in order to reduce expansion or cross-sectional area of the rotor close to the center thereof, improving flow of the material for homogeneous dispersion.

The inventors likewise have tried such approach for the purpose of mixing and kneading hard rubber but with unsatisfactory results. The inventors also made extensive investigations on a variety of various shapes of vanes to utilize successfully highly efficient kneading performance inherent to the four-vane rotor, using the above described CMC aqueous solution with behavior similar to hard rubber, wherein they first studied flow of the materials within the test machine and confirmed practical effects of the favorable rotor configuration through a small sized internal mixer (internal volume: 4.3 l) and a practical or large sized mixer (internal volume: 236 l).

Figure 8:
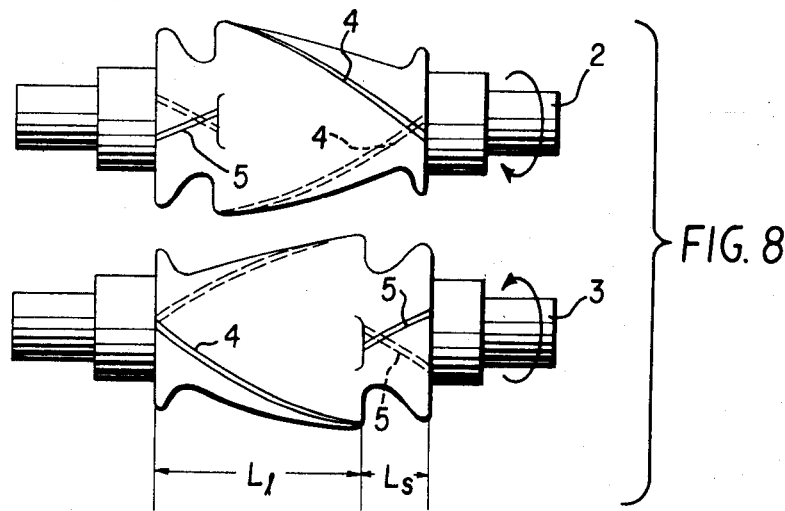
FIG. 8 is a plan view of the rotors embodying the present invention.
Figure 9:
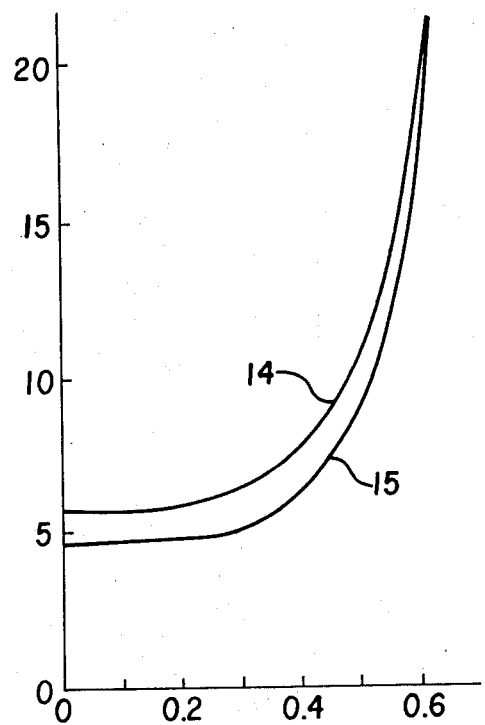
FIG. 9 shows the dependency of dispersibility upon vane length ratio.
Figure 10:
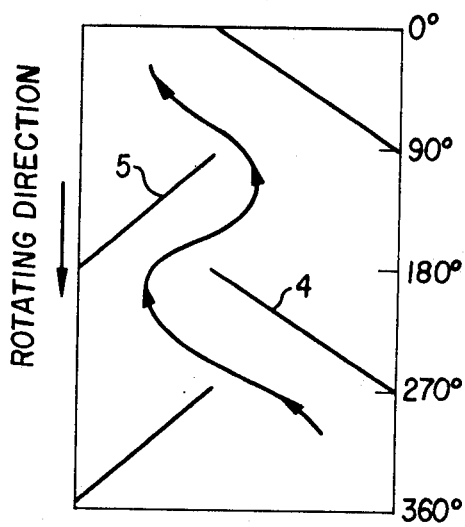
FIG. 10 shows the flow direction of material in the type of prior art rotor shown in FIG. 4.

Deficient dispersion in the four-vane rotors was due to insufficient movement of the materials along the axial direction. In order to accelerate the axial flow, a ratio of the length of the short vanes to that of the long vanes was varied to investigate changes in the effects on dispersion of the plastic beads throughout the CMC solution with the same twist angle and cross-sectional configuration of the vanes as in the conventional rotors through the use of the test machine. The findings showed the nonuniform dispersion of the plastic beads within the CMC solution was minimized to ensure further homogeneity when the length ratio (Ls/Ll) of the short vanes to the long vanes as denoted in FIG. 8 was selected below a fixed value. In other words, homogeneity of a mixture was further enhanced by changing the ratio of the length of the short vanes along the axial direction to that of the long vanes, thereby making it possible to manufacture the fourvane rotors having excellent dispersibility which was not expected in the conventional machine with a length ratio of 0.49. FIG. 9 shows the relation between deviation of bead and length ratio, where curve 14 represents 40 sec. kneading and curve 15 denotes 60 sec. kneading. It is apparent from this drawing that deviation is remarkably increased when the length ratio exceeds 0.4. The smaller the vane length ratio the better the dispersion.

To achieve homogeneous dispersion, it is in principle desirable to reduce the length of the short vanes and provide the rotors with only the consecutive long vanes. The rotors having only the long vanes are, however, disadvantageous in that thrust load on the rotors is too heavy during mixing and kneading of the materials and strong compression of the materials against the side wall of the mixer results in local overheating.

For the above reasons, the vane length ratio is selected to be less than 0.48. preferably within a range of 0.3 to 0.15. As a result of the kneading experiments on the sample materials a vane length ratio of 0.4 lead to satisfactory results comparable with the prior art two-vane rotors.

EXAMPLE

Mastification of natural rubber and pro-kneading of a vulcanizing agent were tested on an internal mixer of 236 l of internal volume with the conventional rotors of a 0.49 vane length ratio (Ls/Ll) and the rotors of a 0.23 ratio embodying the present invention. The results are shown in Table 1 indicating that the rotors embodying the present invention perform further homogeneous dispersion of additives as compared with the prior art two-vane rotors showing excellent dispersion during pro-kneading.

TABLE 1

(Capacity of Dispersing an Agent by Rotors During Pro-Kneading)

| | Rotor | | |
|---|---|---|---|
| | Sample Rotor | Conventional Rotor | Conventional Rotor |
| | Number of vanes | | |
| | 4 | 4 | 2 |
| Rubber | | Length ratio | |
| Material | 0.23 | 0.49 | — |
| Soft rubber | 0.75 | 10.4 | 1.0 |
| Medium rubber | 0.5 | 3.1 | 1.0 |
| Hard rubber | 0.3 | 1.0 | — |

As noted earlier, the first embodiment of the present invention assures good dispersion from macroscopic and microscopic points of view through the improved vane structure of the rotor. The present invention exhibits excellent properties for rubber kneading such as pro-kneading, mastification, carbon master batch kneading.

Although the above specific embodiment shows only an example of the four-vane rotor, it is obvious that a much larger or smaller number of vanes such as two vanes are also applicable.

Moreover, the present invention eliminates the need to make the central portion of the rotor thinner as experienced in the above-referenced Patent Publication 42-27032, and enhances strength and durability.

Figure 11:
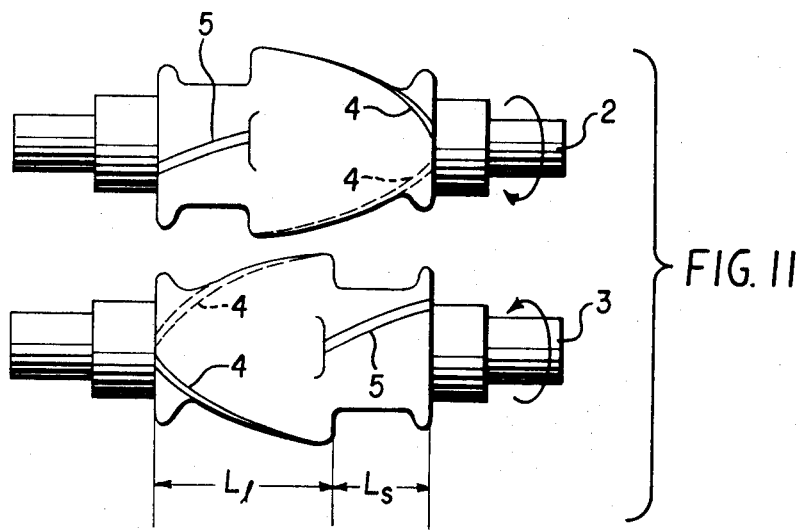
FIG. 11 is a plan view of the rotors of a second embodiment of the present invention.

Turning next to the second embodiment of the present invention shown in FIG. 11, as is obvious from FIGS. 1 through 6 and 10, each of such conventional rotors within an internal mixer has spiral vanes to send material along the axial direction of the rotor. The behavior of the material in the interior of mixing chambers can be divided into a flow along the axial direction of the rotors and a flow between the left and right mixing chambers accommodating the respective rotors. In order to produce a homogeneous mixture, it is necessary to accelerate the axial flow and the interchamber flow and inhibit stagnation of the material within the mixing chambers. For this reason the long and short vanes on the respective rotors are wound spirally in the opposite directions to each other and correlated with respect to length at a ratio of approximately 0.48 to 0.1 such that the material is pushed back from the edges to the centers to prevent the material from staying at the edge portions and pushed back between the long and short vanes along the axial directions to distribute effectively the material to be mixed. The long and short vanes are substantially equal in twisting amount in order not to develop any thrust at the rotors even when the material exerts pressure on the long and short vanes. The relationship between the twisting amount and the thrust will now be described. The material to be mixed undergoes force normal to the working area of the long vanes (or the short vanes) and is propelled along the axial direction by an axial component of the force during revolution of the rotors. This thrust along the axial direction is determined by the screwing angle and length of the long vanes (or the short vanes). The thrust $Pl(Ps)$ can be written as follows:

$$Pl = f \times Ll \times \tan\theta l$$
$$= f \times al$$
$$Ps = f \times L_s \times \tan\theta_s$$
$$= f \times a_s$$

Figure 12:
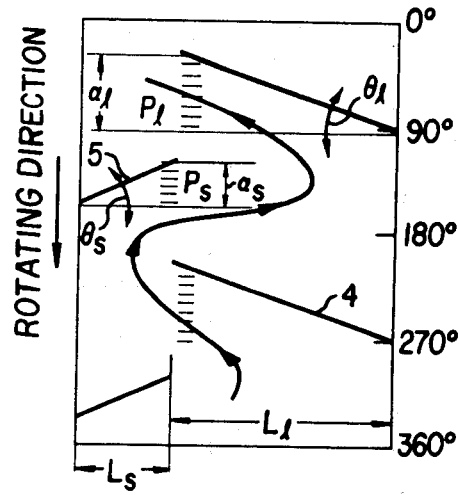
FIG. 12 shows the details of the embodiment of FIG. 11.

-continued
$$Ps/Pl = a_s/al$$

Wherein $\theta l(\theta s)$ is the screwing angle, $Ll(L_s)$ is the vane length, $al(a_s)$ is the twist amount, and f (constant) is the axial thrust per unit width in FIG. 12.

The above formula suggests that a ratio of the thrust by the long vane to that by the short vane is determined by the twist angle. The inventors' experiments on pro-kneading of hard rubber materials by means of an internal mixer (inner capacity: 236 l) having four-vane rotors revealed that distribution of an agent was remarkedly uneven for some types of rubber materials and the four-vane rotor machine was quite inferior to the two-vane rotor in distribution of an additive. A model test machine as described hereinabove was made to observe the behavior of the flowing material within the mixer for investigation of causes of the non-uniform distribution. The test machine again included a barrel made of acrylic resin and was adapted to enable direct observation of the flowing material therein. In addition, in order to evaluate distribution through quantitative analysis, a fixed amount of colored plastic beads (polyester) was added and the number of the beads contained in several samples was repeatedly (n times) measured after kneading, thereby calculating the deviation ($\sigma_{n-1}$) of the beads number. The test machine was of the same size as in an internal mixer with an inner capacity of 1.7 l. An aqueous solution comprising 30% of CMC (carboxymethylcellulose) was found suitable as material exhibiting a flowing behavior similar to hard rubber material within practical use mixers and as a matter of fact employed in the above experiments.

Generally speaking, if the filling factor is increased in the four-vane rotor machine, then distribution properties will be markedly deteriorated, even with an elongated period of mixing and kneading. The reasons why the four-vane rotor machine was inferior in distribution have been revealed as follows. Since two long vanes and two short vanes on a single rotor are twisted in direction to push material toward the center, the edges of the long vanes are 180° out of phase from the edges of the short vanes to facilitate a flow of the material at the central portion of the rotor where both vanes are located closely to each other. The material flowing from one end of the rotor shaft to the center thereof by the action of the long vanes is pushed back toward the long vanes by the action of the reversely twisted short vanes shortly after separating from the edges of the long vanes, without slowly reaching the other end of the rotor shaft. This results in a conflict in flow of the material at the central portion of the rotor and loss of flow of the material along the axial direction necessary to produce a homogeneous mixture. Contrarily, in the case of a two-vane rotor, while the edge of the long vane is overlapped in part with the edge of the short vane at the center of the rotor as indicated in FIG. 1, the material flowing toward the center of the rotor shaft by the action of the long vane is released at the edge of the long vane to flow into a space about the short vane at the rear side thereof and toward the long vane. Although movement of the material is similar to that in the four-vane rotor machine, the long vane and the short vane each is one so that a space allowing movement of the material is wide enough to facilitate the axial direction and produce a homogeneous mixture.

As previously mentioned, one approach to overcome nonuniform mixing and kneading due to such an insufficient flow of material within fourvane rotor machines was suggested as disclosed in Japanese Patent Publication 42-27032 by David Z. Taison et al. That is, the cross-sections of long and short vanes are selected to reduce the width of the central portion of rotors and thus the cross-sectional area thereof, thus improving the flowing behavior of material to achieve uniform distribution. The inventors traced such approach in mixing and kneading hard rubber material but found it inefficient and unsatisfactory on the practice of mixing hard rubber material.

The inventors, therefore, conducted additional investigation on a variety of various shapes of vanes to take advantage of a high mixing efficiency inherent to the above-mentioned four-vane rotor by the utilization of the CMC containing aqueous solution which is similar to hard rubber in behavior. It has been concluded that vane shapes as viewed from FIG. 11 are also desirable. Like the prior art device, each of a pair of parallel rotors 2, 3 is provided with a long vane 4 and a short vane 5 and the long and short vanes are spiral in the opposite directions to each other to propel material to the center of the rotors. However, according to one of the important features of the present invention, the twist amount is selected such that a ratio of axial thrust exerted on the material by the short vane to that by the long vane is within the range of 0.7 to approximately 0. With such an arrangement, the flowing behavior of the material along the axial direction differs between the two rotors and is accelerated to enhance homogeneousness of resulting mixtures.

FIG. 12 is a detailed, exploded view of the rotors embodying the present invention as shown in FIG. 11, whereby a ratio (Ps/Pl) of the thrust Ps by the short vane 5 to the thrust Pl by the long vane 4 is established within the range of 0.7 to approximately 0 by a proper choice of the twist amount. In this case the material is pushed back alternatively by the long and short vanes and the axial flow of the material is accelerated by switching back of the axial direction with respect to the material. It is further necessary that a length ratio (Ls/Ll) of the short vane to the long vane be within the range of 0.48 to 0.1 to prevent the material from stagnating at the shaft edge.

To take advantage of the kneading efficiency of a four-vane rotor, intensive research was undertaken into the vane configuration using an aqueous solution of carboxymethyl-cellulose which is similar in behavior to hard rubber. In the first place, the dynamics or flow of the material was studied with a model testing machine and, as to the rotor configurations which have given satisfactory results, the effects were first confirmed with a small internal mixer (capacity 4.3 l) and then verified as to practical utility in a full-scale trial with a commercial mixer (capacity 236 l).

Figure 13:
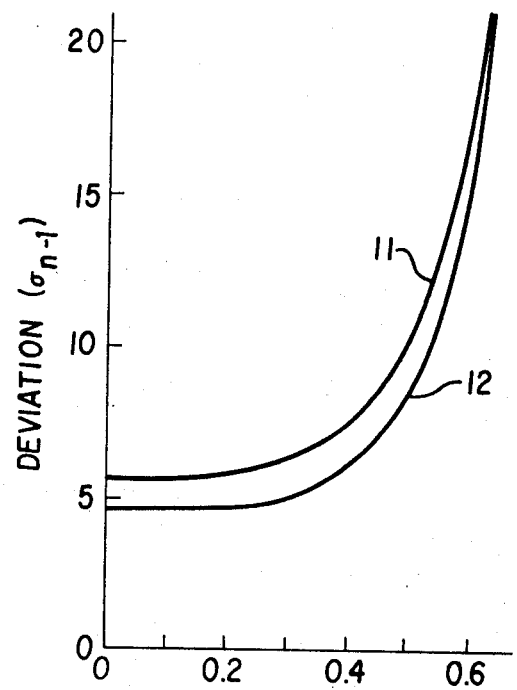
FIG. 13 shows the relation of vane length with variance in the distribution of the beads.

In view of the fact that the poor dispersion effect of the fourvane rotor was attributable to the flow of material in the axial direction, it was first tried to improve the axial flow. Thus, using a model testing machine with the torsional angle and sectional shape of the vanes being set to those of the conventional standard rotor, the ratio of the long vane to the short vane was varied and the resultant influence on the uniformity of dispersion of plastic beads into CMC was investigated. As a result it was found that if the ratio of the long vane to the short vane (Ls/Ll) (FIG. 12) and the thrust ratio were held below certain values, the variation in distribution (deviation) of plastic beads in the kneaded mixture was reduced to yield a significantly improved homogeniety. Thus, by varying the ratio of the axial lengths of the short and long vanes, the homogeniety of the mixture was considerably improved and thus it was made possible to build a four-vane rotor giving satisfactory dispersion characteristics which could never be attained by the conventional rotor having a standard vane length ratio of 0.49. In FIG. 13, which shows the relation of the vane length ratio with the variance in distribution of the beads, reference numeral 11 represents the characteristics corresponding to a kneading time of 40 seconds and reference numeral 12 shows the characteristics at 60 seconds. It will be seen from FIG. 13 that the variance increases sharply as the vane length ratio exceeds 0.4 and that the degree of dispersion is improved as the vane length ratio becomes smaller.

To achieve a homogenious dispersion, the rotor is preferably made up of contiguous long vanes, i.e. with the length of short vanes being equal to zero. However, with such a rotor having long vanes only, the thrust load acting on the rotor in the course of kneading will be too great and, moreover, the material will be compressed too tightly against the side wall of the mixer to cause a local overheat. Therefore, the vane length ratio is set within the range of 0.48 to 0.1 and, preferably, within the range of 0.3 to 0.15. The result of a kneading test with a vane length ratio of 0.4 was comparable to the result obtained with the conventional two-vane rotor.

Figure 14:
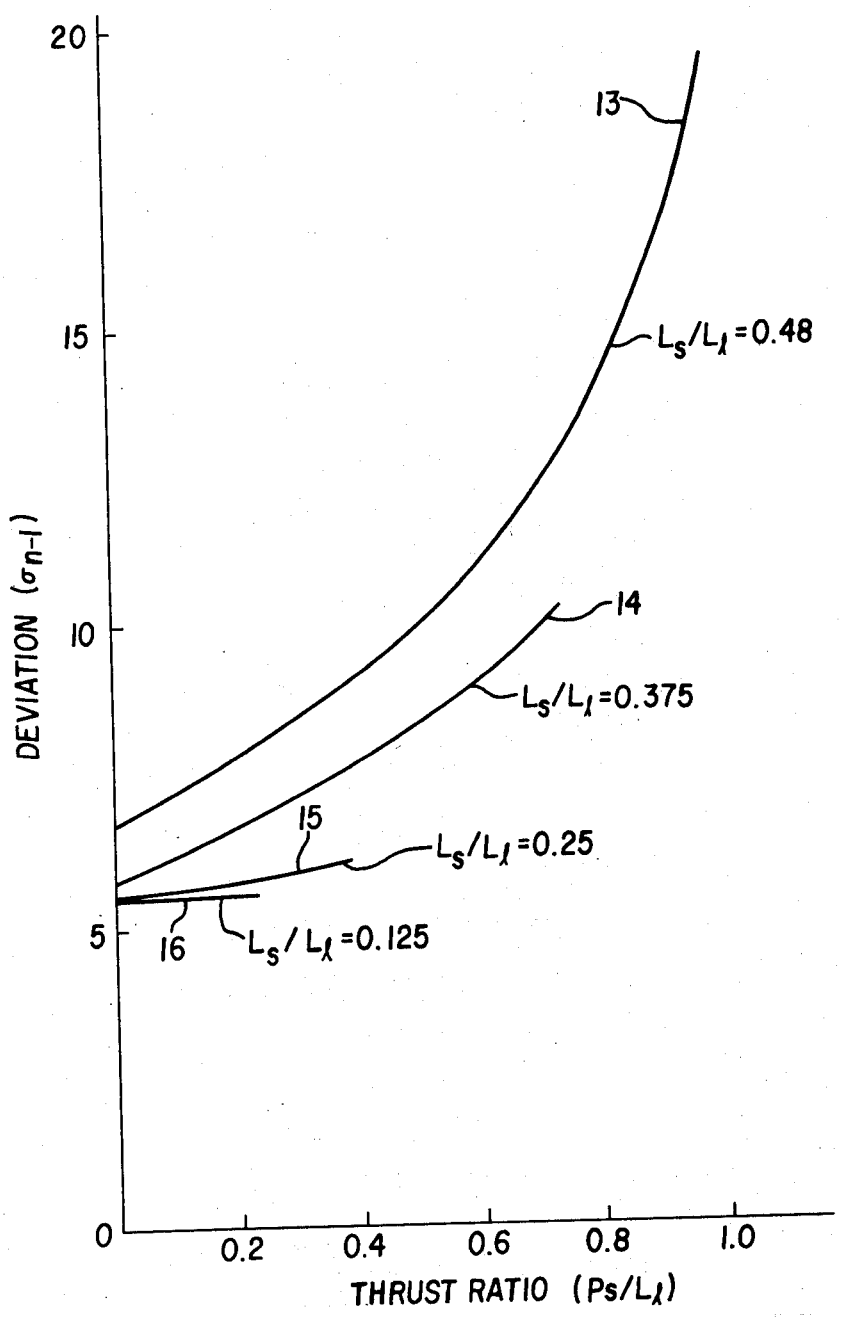
FIG. 14 shows the relation of the thrust ratio with the variance in distribution of the beads.

Further, FIG. 14 shows the relation of the thrust ratio with the variance in distribution of beads. In FIG. 14, reference numerals 13, 14, 15 and 16 represent the characteristics corresponding to Ls/Ll=0.48, Ls/Ll=0.37, Ls/Ll=0.25 and Ls/Ll=0.12, respectively. It will be seen from FIG. 14 that, in any of the cases of 13, 14, 15 and 16, the variance begins to increase considerably as the thrust ratio (Ps/Pl) exceeds 0.7 while the variance becomes smaller as the thrust ratio (Ps/Pl) approaches zero. Even in this instance, as will also be seen clearly from FIG. 14, the variance is very satisfactory with any of the vane length ratios (Ls/Ll) when the thrust ratio (Ps/Pl) is not more than 0.45. Therefore, the thrust ratio (Ps/Pl) is set somewhere between 0.7 and zero, and preferably 0.45 to nearly 0.

In order that the material flowing toward the short vane by the action of the long vane be forced back to the rear side of the long vane by the short vane, a sufficient passageway is required between the edge of the long vane and that of the short vane. In accordance with the present invention, such a passageway may be established by reducing the twist amount of the short vane as compared with the prior art. This leads to a reduction in pressure of the material within the mixing chamber, quick thrusting operation on the material and a minimal axial thrust exerted upon the rotors.

Moreover, satisfactory results were given when the present invention was applied to commercial or practical use mixers to carry out pro-kneading on hard rubber added with a vulcanizer. For the so-called pro-kneading or kneading of a vulcanizer, the temperature of rubber should be limited below a predetermined temperature (say, 110° C.) to prevent vulcanization of additives during mixing. It should be understood that mixing and kneading is effected to achieve thorough distribution without a temperature rise. Although a consecutive vane structure consisting of a series of long vanes and a series of short vanes disposed alternatively with each other as disclosed and illustrated in Japanese Utility Model Publication No. 49-4330 is deemed effective for the sole purpose of enhancing rotating movement of the material within the mixing chamber, the consecutive vane structure is not proper for pro-kneading because it undergoes a sudden temperature rise of rubber material. In addition, by dividing the vanes into long ones and short ones both in the opposite directions the present invention can reduce the thrust force exerted on the rotors in operation by half in comparison with the consecutive vane structure. As noted earlier, the present invention enables excellent macroscopic and microscopic mixing and kneading and yields satisfactory results in pro-kneading, primary kneading, carbon master kneading or other rubber kneading processes by an improvement in the rotor vanes. For the present invention, there is no need to reduce the dimension of the central portion of the rotor and facilitate flow of the material as taught by the above referenced Japanese Patent Publication No. 42-27032, thus increasing strength and durability of the rotors.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed as new and desired to be secured by letters patent of the United States is:

1. A mixing and kneading machine including a mixing chamber defined by a casing comprising:
    a pair of parallel rotors disposed within said casing, each of said rotors having at least one long vane and at least one short vane, both of which extend spirally about the center lines of the rotors such that material to be mixed flows from the edges of the rotors into the central portion thereof and in that a ratio of the length of the at least one short vane along the axis of each of the rotors to that of the at least one long vane is selected within the range of 0.48 to 0.1; and
    means connected to said rotors for rotating said rotors in opposite directions.

2. A mixing and kneading machine according to claim 1, wherein the length ratio of the at least one short vane to the at least one long vane is selected within a range of 0.4 to 0.1.

3. A mixing and kneading machine according to claim 1, wherein the length ratio of the at least one short vane to the at least one long vane is selected within a range of 0.3 to 0.15.

4. A mixing and kneading machine according to claim 1, wherein said at least one long vane comprises a plurality of long vanes and said at least one short vane comprises a plurality of short vanes.

5. A mixing and kneading device and a mixer comprising:
    a mixing chamber; and
    a pair of parallel rotors rotating in opposite directions within said mixing chamber, each of said rotors comprising a long vane and a short vane, both of which extend spirally about the center lines of the rotors, such that material to be mixed flows from the edges of the rotors into the central portion thereof, and in that a ratio of the length of the short vanes along the axis direction of the rotors to that of the long vanes is selected within a range of 0.48 to 0.1 and in that a ratio of axial thrust acting on the material by the short vane to that by the long vane is determined within the range of 0.7 to approximately 0.

* * * * *